United States Patent
Ristea et al.

(10) Patent No.: US 7,043,970 B2
(45) Date of Patent: May 16, 2006

(54) METHOD FOR MONITORING WOOD-DRYING KILN STATE

(75) Inventors: Catalin Ristea, Coquitlam (CA); James Alan Felsheim, Grants Pass, OR (US); Thomas Christopher Maness, Vancouver (CA)

(73) Assignee: Wagner Electronic Products, Inc., Rogue River, OR (US)

( * ) Notice: Subject to any disclaimer, the term of this patent is extended or adjusted under 35 U.S.C. 154(b) by 0 days.

(21) Appl. No.: 10/722,389

(22) Filed: Nov. 28, 2003

(65) Prior Publication Data

US 2005/0115307 A1    Jun. 2, 2005

(51) Int. Cl.
   *G01N 25/56* (2006.01)
(52) U.S. Cl. .......................................... 73/73
(58) Field of Classification Search .................... 73/73
   See application file for complete search history.

(56) References Cited

U.S. PATENT DOCUMENTS

| | | | | |
|---|---|---|---|---|
| 4,107,599 | A * | 8/1978 | Preikschat | 324/689 |
| 4,193,761 | A * | 3/1980 | Mantegani | 432/128 |
| 5,586,066 | A * | 12/1996 | White et al. | 702/181 |
| 6,077,552 | A * | 6/2000 | Chimenti et al. | 426/231 |
| 6,305,224 | B1 * | 10/2001 | Stanish et al. | 73/597 |
| 6,308,571 | B1 * | 10/2001 | Stanish et al. | 73/597 |
| 6,703,847 | B1 * | 3/2004 | Venter et al. | 324/663 |
| 6,735,576 | B1 * | 5/2004 | Kaji et al. | 706/1 |
| 2003/0110007 | A1 * | 6/2003 | McGee et al. | 702/179 |

FOREIGN PATENT DOCUMENTS

JP    80016205 B  *  4/1980

OTHER PUBLICATIONS

Bramhall, G., "Meeting New Kiln Drying Standards," 1975, Canadian Forest Industries, 95(9), pp. 33-35.
Bramhall, G. and Warren, W.G., "Moisture Content Control in Drying Dimension Lumber," 1977, Forest Products Journal, 27(7), pp. 26-28.
Cohen, A.C., "Estimating Parameters of Logarithmic-Normal Distributions by Maximum Likelihood," 1951, Journal of the American Statistical Associate, 46(254), pp. 206-212, 1951.
Cohen, A.C., Whitten, B.J., and Ding, Y., Modified Moment Estimation for the Three Parameter Lognormal Distribution, 1985, Journal of Quality Technology, 17(2), pp. 92-99.
Ferrell, E.B., "Control Charts for Log-Normal Universes," 1958, Industrial Quality Control, 15(2), pp. 4-6.

(Continued)

*Primary Examiner*—Hezron Williams
*Assistant Examiner*—John Fitzgerald
(74) *Attorney, Agent, or Firm*—Klarquist Sparkman, LLP

(57) ABSTRACT

The method utilizes a known good set of moisture content data for wood dried in a kiln under set conditions to estimate parameters for a Lognormal distribution which approximates the moisture content data for those conditions. The method creates control charts which monitor some of these parameters. The method also takes data from subsequent kiln charges and transforms it to be represented on the control charts. The method uses this representation to determine if the kiln is operating under out-of-control conditions.

33 Claims, 9 Drawing Sheets

OTHER PUBLICATIONS

Joffe, A.D., and Sichel, H.S., "A Chart for Sequentially Testing Observed Arithmetic Means from Lognormal Populations Against a Given Standard," 1968, Technometrics, 10(3), pp. 605-612.

Maki, R.G., and Milota, M.R., "Statistical Quality Control Applied to Lumber Drying," 1993, Quality Progress, 26(12), pp. 75-80.

McMahon, E.P., "Applying Cumulative Frequency Distribution in Moisture Control During Kiln Drying," Forest Products Journal, 11(3), pp. 133-138.

Morrison, J., "The Lognormal Distribution in Quality Control," 1958, Applied Statistics, 7(3), pp. 160-172.

Noghondarian, K., "Quality Control with Non-Normal, Censured and Truncated Data," 1997, Ph.D. Thesis, University of British Columbia, Department of Mechanical Engineering.

Pratt, W.E., "Some Applications of Statistical Quality Control to the Drying of Lumber," 1953, Journal of FPRS, 3(5), pp. 28-31.

Pratt, W.E., "Estimating the Moisture Content of Lumber During the Drying Process," 1956, Forest Products Journal, 6(9), pp. 333:337.

Zwick, R.L. and Cook, J.D., "The Modeling of Moisture Content Distributions Based on Censored Readings from a Resistance Meter," 1985, Technical paper presented at Western Dry Kiln Association Meeting.

Maki, "An Application of Statistical Process Control Measures for Maintaining Optimal Quality from Dry Kiln Operations," Thesis submitted to Oregon State University, Apr. 26, 1991, 120 pages.

* cited by examiner

Normal distribution curve

Lognormal distribution curve

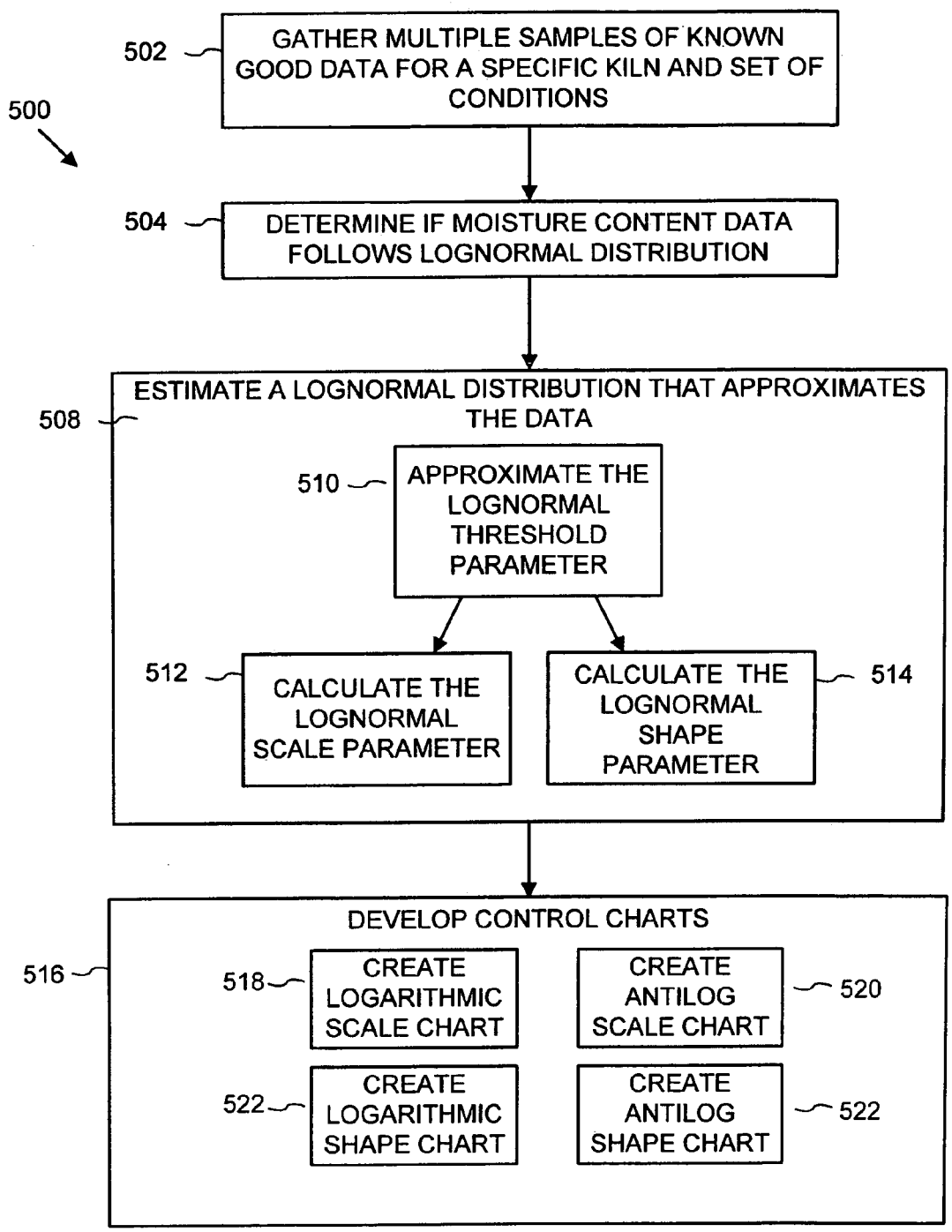

METHOD FOR MONITORING WOOD-DRYING KILN STATE

TECHNICAL FIELD

The invention relates to control systems for kilns used to dry wood.

BACKGROUND

Wood naturally contains moisture. However, for wood lumber to be useful for building, the moisture content must fall within certain constraints. Too much or too little water in the lumber can cause serious problems in the subsequent processing and use of the lumber, including warping or difficulties with painting or gluing. In order to provide a useful product, most lumber mills dry their lumber under controlled processes, such as in a kiln, prior to sale. It is difficult, however, to ensure that every board in a given charge will have exactly the same moisture content after drying.

Part of the problem lies in the nature of the wood itself; wood is a non-homogenous material that does not dry at a constant rate. Even within a charge with all boards of the same size and same type of wood there are many factors that can affect drying rate. Individual different boards may have natural variability in their drying rate, may start out with different moisture content, may be composed of different percentages of sapwood and hardwood, or may contain wet pockets. Moisture variations can also result from variable drying conditions between different kilns at the same mill or within a single kiln charge due to the locations of particular boards within a kiln. While the variation between charges or kilns can be monitored using averages, the variability within a charge is best monitored using standard deviations. One method by which this monitoring can be done is by using statistical process control (SPC).

SPC works to continuously improve the quality of a process through the constant application of statistical methods to data produced at various stages of the process. Ideally, disturbances within the process are quickly discerned, then, using the data set, causes are assigned to those disturbances. In the best case, this is done with sufficient speed that investigation of the problem, diagnosis, and corrective action can be taken before many noncomforming products reach the final state of the process. This is usually done through the use of parametric control charts for variables. Generally, by plotting the average and standard deviation of multiple samples on a control chart and comparing those values against computed acceptable limits, the chart can be used to determine if a process is going out of control.

The starting point for SPC analysis is an understanding of the underlying distribution of the data under analysis. The conventional assumption has been that wood moisture content data is approximately Normally distributed. However, wood is a non-homogenous material, and even when it is kiln-dried under controlled conditions, the moisture content retains large variability through the wood pieces, so a board with an acceptable average rating may be quite dry in one section and quite wet in another. Additionally, because kiln-dried wood cannot be dried past the point at which it reaches equilibrium with the air in the kiln, there is an effective lower limit on moisture content. Thus, a Normal distribution has proven less than ideal for SPC analysis of wood drying and has made the task of creating a proper model for SPC analysis of wood drying difficult. It is desirable to design control charts specifically to monitor wood-drying, using a better-performing distribution model, if possible.

The theory of variability is the basis for the construction and use of control charts. The purpose of any monitoring process is to sort out meaningful signals from background noise. A certain amount of variability in the moisture content of the dried lumber—background noise—exists in the kiln-drying process. Boards dry at different rates due to inherent properties in the wood itself, as mentioned above. This natural variability can be considered a system of "common causes." A drying process that is operating with only common causes of variation is considered to be in statistical control.

A major objective of the control charts is to sort out a meaningful signal from the background noise. When the moisture variability of the dried wood exceeds the background noise variability, this might indicate that there are problems associated with the kiln itself. This variability in moisture content usually arises from three sources: improperly adjusted kiln equipment, operator errors, or defective raw material. Such variability may be large when compared to the background noise, and it usually represents an unacceptable level of process performance. These sources of variability are called "assignable causes." A process that is operating in the presence of such causes is said to be "out of control." A kiln can operate in the "in control" state for a long time, producing acceptable moisture content levels in lumber. Eventually, however, assignable causes will occur, resulting in a shift to an out of control state, where the lumber produced no longer conforms to requirements.

A major objective of the control charts is to quickly detect the occurrences, or the trends toward assignable causes of process shifts, which allows investigation into causes, and corrective action to be undertaken before many nonconforming units are produced. Control charts can also be used to estimate the parameters of the kiln-drying process, to determine process capability, and to incrementally improve the process. In general, control charts are an effective tool that can be used to reduce process variability.

Many quality control methods suggested in the literature are concerned with the average moisture content alone, and therefore use methods such as sample estimation, or go/no go decision criteria, such as acceptance sampling. Other methods have been tried that do concern themselves with variation, but are based on the assumption that moisture content has a Normal probability distribution. This assumption tends to erroneously consider certain in-control conditions as defects or out-of-control conditions. Furthermore, assumptions of Normality underlie many other common statistics, such as correlation coefficients, t-tests, and others that may be used in standard statistical analysis. The failure to understand that a distribution is not Normal leads to a rippling statistical effect, with invalid assumptions producing incorrect answers which are themselves imperfectly analyzed, and so on.

Lognormal, rather than Normal, probability plotting for kiln analysis has been proposed by "Moisture Control During Kiln Drying," McMahon, 1961, in conjunction with frequency distribution analysis and quality control methods. These techniques were used to estimate the average moisture content and the percentage of moisture content outside of certain boundaries. McMahon's methods were only approximate, however and introduced procedural errors that were potentially large. Additionally, McMahon's technique failed to properly account for the lower moisture content limit of kiln-dried wood. What is needed is a method that accounts for the lower moisture content limit that kiln-dried wood approaches and monitors kiln conditions more closely.

SUMMARY

A method for monitoring the drying of wood in a kiln is described herein. The method uses a set of known good samples of moisture content data for wood dried in a kiln to estimate a Lognormal statistical distribution which approximates the known good set of data. The method estimates three parameters of a Lognormal distribution: the threshold parameter, the shape parameter, and the scale parameter. Then one or more new sample of moisture content data is obtained from a subsequent drying in the kiln. The method develops one or more control charts containing center lines and control limits which monitor at least one of the estimated parameters. Next, data from the new sample or samples of moisture content data is transformed to represent the parameters on the control charts. Finally, a determination is made about whether the kiln is operating in an in-control or out-of-control state.

A computer-readable medium is also described herein. The computer-readable medium contains instructions which, when executed, obtain a known good set of samples of moisture content data from wood dried in a kiln. Then the instructions use the known good data set to estimate parameters for a Lognormal distribution which approximates the known good data. Next the instructions obtain new moisture data for wood dried in the kiln. The instructions then create control charts based on the estimated Lognormal parameters, transform the new data to be represented on the control charts, and determine whether the kiln is operating in an out-of-control state.

Additional features and advantages of the invention will be made apparent from the following detailed description of embodiments that proceeds with reference to the accompanying drawings.

BRIEF DESCRIPTION OF THE DRAWINGS

FIG. 5 is a block diagram of a method to develop control charts

DETAILED DESCRIPTION

The following description is directed to improvements in creating quality control charts so that they more accurately and realistically monitor the variability of moisture content in kiln-dried lumber. These control charts are then used with more-recently collected data to determine if a kiln is out-of-control.

1. Moisture Content Measuring Environments

Figure 1:
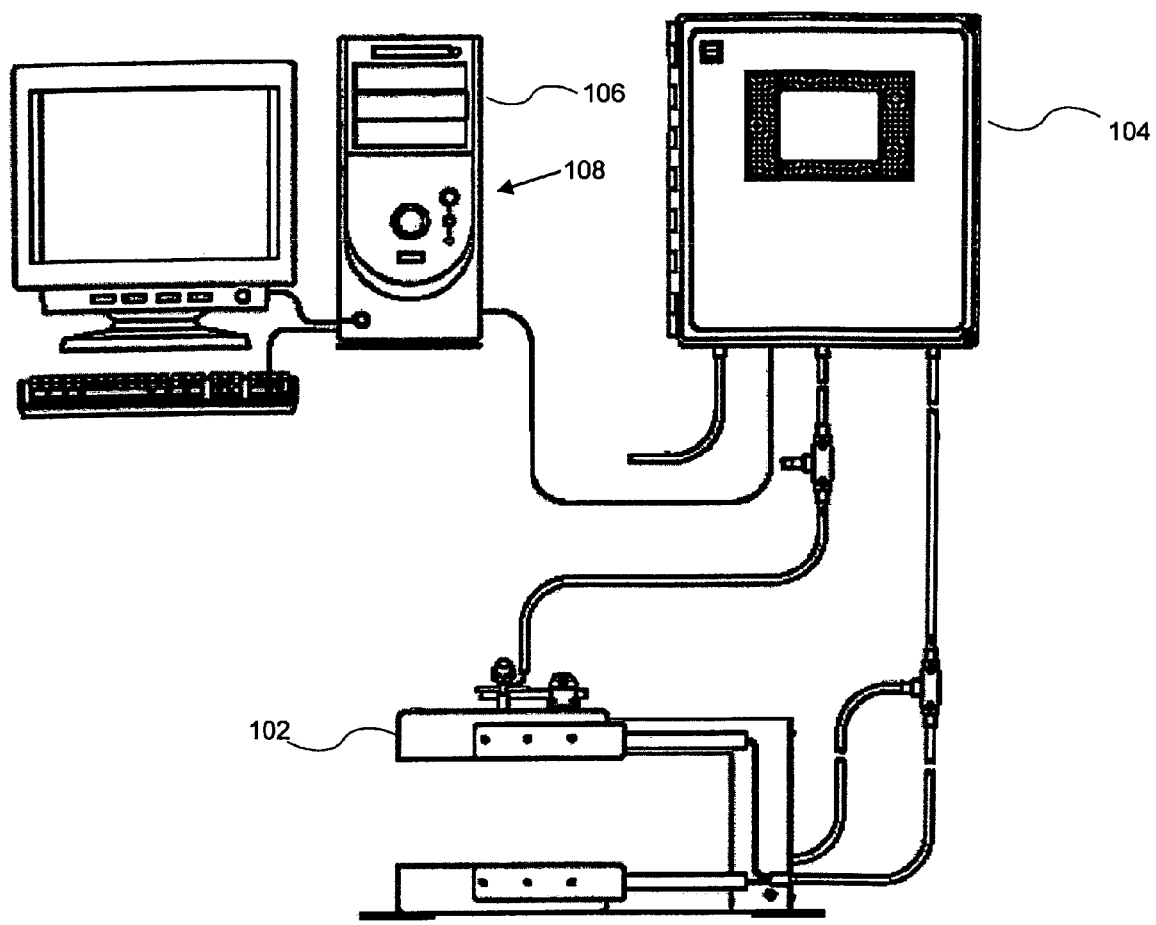
FIG. 1 is a diagram of a suitable environment in which described embodiments may be implemented.

In an exemplary embodiment, moisture control measurements are collected from kiln-dried lumber. FIG. 1 depicts one environment for measuring moisture content in wood. In the illustrated embodiment, a lineal moisture content sensor 102 is controlled by a moisture content control console 104. By adjusting various settings on the console 104, the sensor 102 can be made to measure the moisture content of various types, sizes, and shapes of wood. When data is received by the console 104, the data is sent to a computer 106, running moisture content monitoring software 108 (not pictured). As will be discussed below, the data received by the computer 106 can be analyzed by software 108 to determine if any out-of-control situations exist in the drying process.

Figure 2:
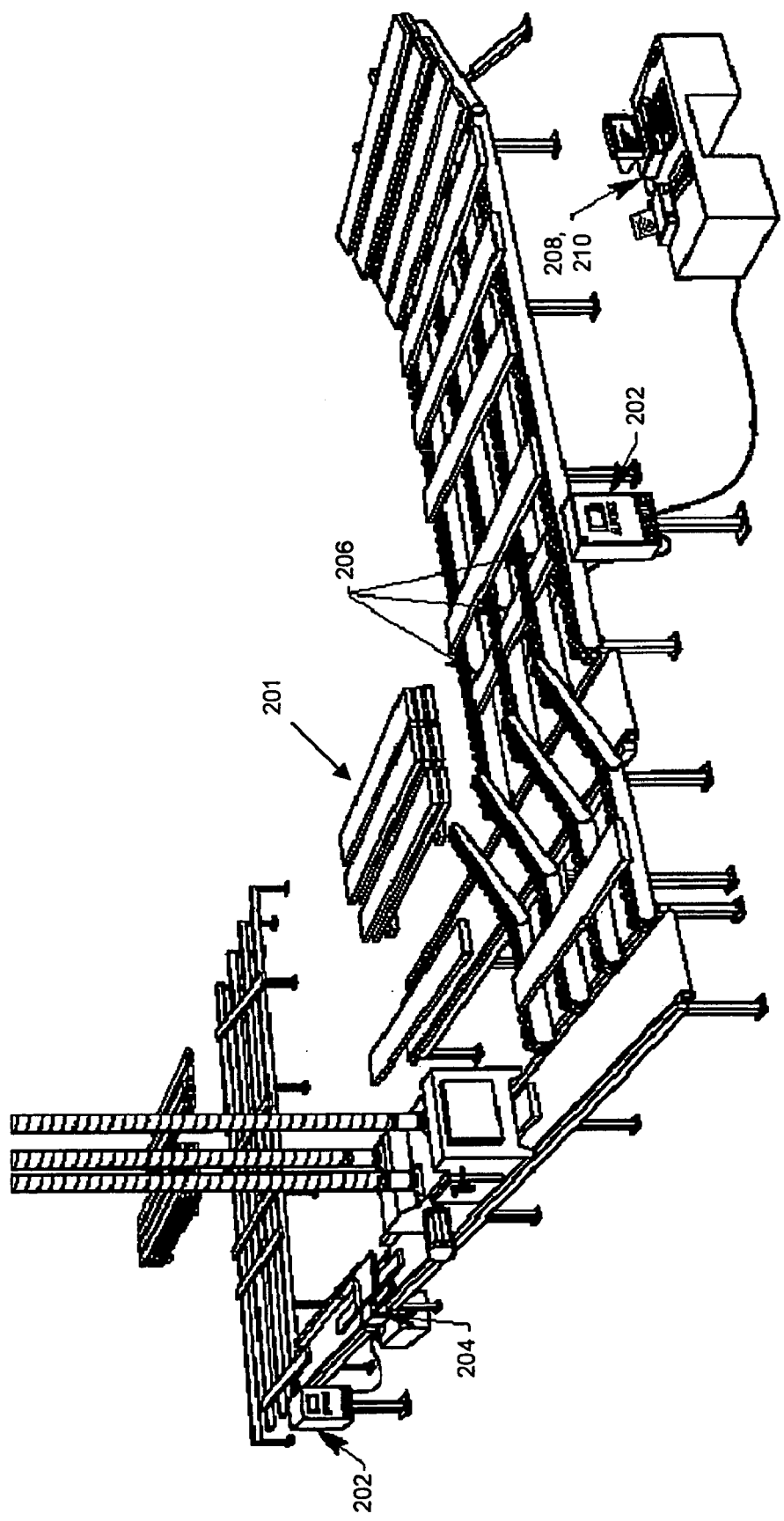
FIG. 2 is a diagram of a suitable environment for measuring moisture content of wood.

With respect to FIG. 2, an environment featuring various moisture sensors in a lumber mill is shown. In the illustrated embodiment, wood boards 201, which have been dried in a kiln, are sent through various in-line continuous moisture sensors, including a lineal moisture sensor 204 and a transverse moisture sensor 206, both controlled by moisture control consoles 202. Also illustrated is computer 208, running moisture content analysis software 210, which collects data from the moisture content control consoles 202 for analysis. In another embodiment, moisture content readings may be made by types of sensors other than those illustrated, including a hand-held sensor, a pin-type sensor, or a contact sensor. In yet another embodiment the computer 208 and software 210 may be integrated into individual control consoles 202 or the system may incorporate a single master computer which communicates with every control console and sensor to receive and analyze moisture content data.

2. Particulars of Wood Moisture Content Analysis and Lognormal Distribution

As was mentioned above, the unique nature of wood makes it difficult to dry every board in a kiln charge to the same moisture content, providing a variation. Even when boards are made of the same type of wood, are cut to the same specifications, and are dried for identical times and at identical temperatures, variations can still occur between kilns, between charges within a kiln, between boards in a single charge, and even within a single board. Thus, in order to provide as accurate a measure as possible of the stability and consistency of the drying process, statistical methods can be used. However, because the data concerns moisture content in wood, additional consideration must be given to the statistical model used to analyze the data FIGS. 3*a–d* illustrate various examples of distribution for various samples of wood moisture content data. The examples shown were produced by the inventors from studies done by Pratt in 1953, McMahon in 1961, Bassett in 1969, and Milota and Wu in 1995. For ease of description, relevant aspects of the moisture content data distribution examples will be discussed with reference to the histogram displayed in FIG. 3*d*.

Figure 3A:
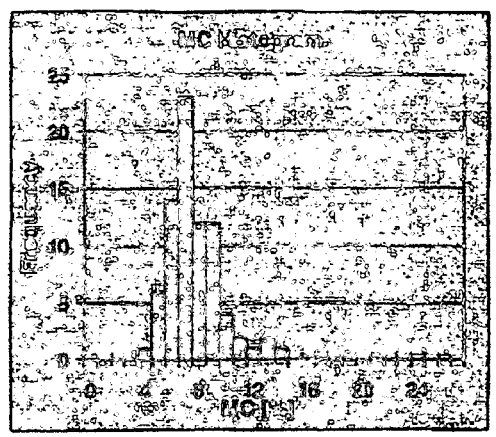
FIGS. 3*a*–3*d* are diagrams showing examples of wood moisture content distribution patters.
Figure 3B:
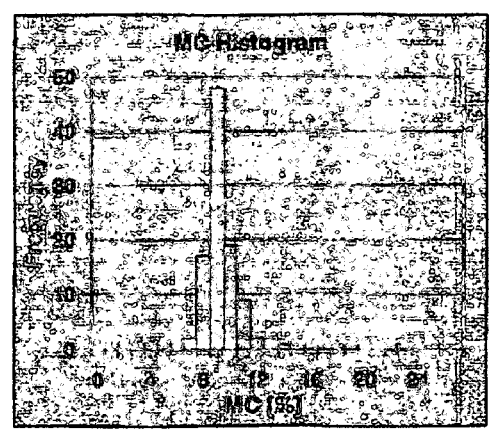
Figure 3C:
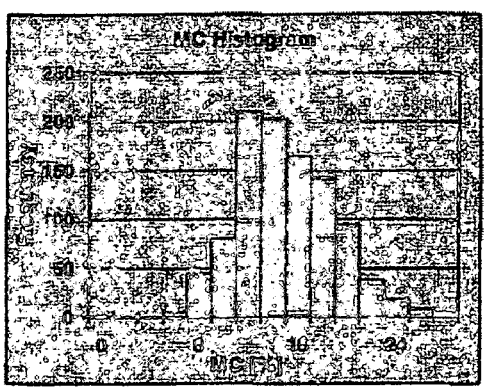
Figure 3D:
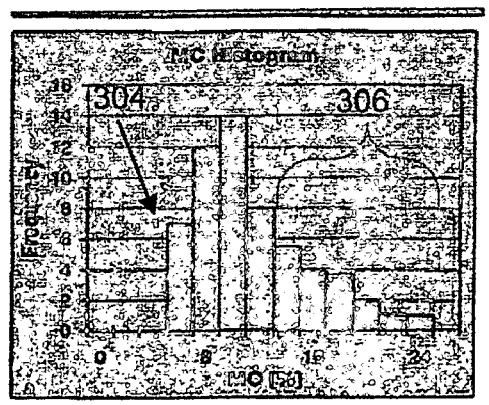

Of chief concern for statistical modeling are the finite left end and positive skewness of the distribution. As the example histogram of FIG. 3*d* demonstrates, and as the histograms of the other figures support, there is a tendency for moisture content distribution to drop off dramatically on the left end of the distribution. This is illustrated in FIG. 3*d* by the location 304. Typically, this dramatic drop-off is due to the fact that the wood cannot have a moisture content lower than the equilibrium moisture content (EMC) set up in the air of the kiln during the drying process, and in any case can never have a moisture content lower than zero. Thus there is a physical lower-bound to the moisture content that can be achieved by kiln-drying, and so a lower-bound to any moisture-content data that can be measured. Additionally, because not every piece of wood dries at the same rate, moisture content data from kiln-dried wood exhibits a positive skewness, as demonstrated by the region 306. This means moisture content data distributions tend to show a trailing right-hand side even while the left had side has a definite edge. While the illustrated characteristics of moisture content data distribution are not necessarily found in every sample of dried wood, they are common to most samples taken, and are thus important to consider when searching for a model that fits well. The system and methods described herein account for these features through the use of a 3-parameter Lognormal distribution model.

Figure 4A:
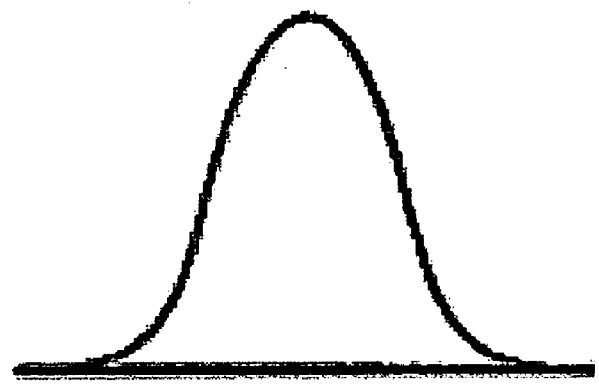
FIGS. 4*a*–4*b* are diagrams showing examples of different distribution models.
Figure 4B:
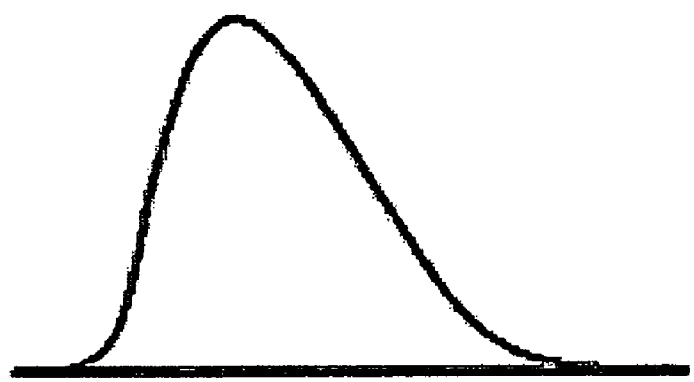

FIGS. 4a and 4b illustrate examples of Normal and Lognormal distribution models. In the example graph of FIG. 4a a Normal distribution curve is demonstrated. As the graph of FIG. 4a demonstrates, Normal distribution curves are horizontally symmetrical and are positively and negatively unbounded. Thus, the Normal curve is frequently not the best fit for the types of distributions mentioned above with respect to FIGS. 3a–d.

Lognormal distribution models, however, do exhibit some of the characteristics described above. A Lognormal distribution model describes a variable that is distributed so that the natural logarithm of the variable has a Normal distribution. The graph of FIG. 4b illustrates a sample Lognormal distribution curve. Unlike the Normal distribution curve in FIG. 4a, the Lognormal curve demonstrates a positive skewness similar to that described in region 306 of FIG. 3d. The Lognormal distribution curve of FIG. 4b also demonstrates a left-hand drop-off similar to that illustrated in location 304 of FIG. 3d. In fact, as will be described below, the Lognormal distribution utilized in the present system includes a threshold parameter which provides a bounded minimum to the distribution, thus more closely approximating the behavior of kiln-dried wood.

The Lognormal distribution model utilized in the present system and method makes use of three parameters, a threshold parameter $\theta$, a scale parameter $\mu$, and a shape parameter $\sigma$. As described above, the use of the threshold parameter is to provide a lower bound for the distribution model, i.e. a minimum amount of water that could exist under the drying conditions being studied. The scale parameter essentially serves to stretch or compress the curve on the horizontal axis, while the value of the shape parameter subtly affects the shape of the curve. The use of parameters such as these is well understood in general statistical distribution analysis, although not with regard to analysis of wood moisture content. Mathematically, the general form of this Lognormal probability distribution function with three parameters is given by the function:

$$f(x) = \frac{e^{(-(\ln(x-\theta)-\mu)^2/(2\sigma^2))}}{(x-\theta)\sigma\sqrt{2\pi}} \text{ for } x \geq \theta \quad (1)$$

While data that follows a Lognormal distribution can be described with the function (1), the moisture content data is not analyzed directly in the system and methods described herein. Traditionally, a control chart plots the arithmetic mean and standard deviation (or variance) of multiple samples against a central tendency line and control limits in order to monitor process conditions. However, for variables that follow a Lognormal distribution, the distribution of standard deviations is not well understood. Additionally, because of the nature of Lognormal distributed variables, the arithmetic mean of a sample is not as good an indicator of central tendency as the geometric mean. Thus, monitoring of averages and standard deviations of the direct sample data is not as useful as other methods.

Instead, the present methods and system perform analysis on logarithmically-transformed data in order to monitor the shape and scale parameters themselves. Because the logarithm of a Lognormal variable is itself Normally distributed, it is known that for a variable X which is distributed Lognormal with a threshold parameter $\theta$, a scale parameter $\mu$, and a shape parameter $\sigma$, then the logarithmically-transformed variable $Y=\ln(X-\theta)$ has a normal distribution with mean $\mu$ and standard deviation $\sigma$. Because methods of SPC are well known for Normal variables, techniques for monitoring the mean and standard deviation of the logarithmically-transformed variable will provide information about changes in the shape and scale parameters of the Lognormal distribution. It is the monitoring of these parameters that the techniques below focus on.

3. Creation of Control Charts for Wood Moisture Content Data

FIG. 5 illustrates a block diagram which describes, in one embodiment, a process for creating a control chart for wood moisture content data. Starting at block 502, known good data is collected so that proper limits and a center line for the control charts can be developed from the data. Because differences in wood type or kiln can affect the drying process, in the preferred embodiment the collection of known good data is done for the specific kiln and under the same conditions in which subsequent drying will take place. In one embodiment this is done by taking multiple samples, with each sample containing multiple wood moisture content readings. These conditions can include, in various embodiments: the species of wood, the type of lumber made of the wood, the method of stacking wood in the kiln, and the drying schedule. In one embodiment the data is divided up for analysis into subgroups, allowing greater discernment of kiln drying problems. Thus, analysis can be performed at once for all boards in a kiln charge, between packs of boards in a kiln charge, or even between boards in a particular pack. This provides flexibility to more readily identify and correct problems.

In one embodiment, in order that the data can be trusted to properly represent moisture content data distribution, the data collection is done at a time when the kiln being used is known to be "in-control," i.e. operating within normal parameters and producing conforming product. In the preferred embodiment, care is taken during the process of block 502 to ensure that the known good data taken is done randomly and independently. In one embodiment this is done through a random sampling with replacement, and by ensuring that no two measurements had any overlap.

Next, at block 504, it is determined if the known good data fits a Lognormal distribution. In the preferred embodiment the process of block 504 is performed so that in case, for some particular set of conditions, the data does not follow a Lognormal distribution, subsequent analysis can follow Normal (or other) distribution techniques rather than the Lognormal techniques described herein. In various embodiments, this determination is performed through the use of graphical and/or numerical methods, such as investigation of symmetry and probability plotting of the Lognormal variable X and goodness-of-fit tests of the Normal distribution to the transformed variable Y.

If, at block 504 it is determined that the known good data follows a Lognormal distribution, then at block 508 a Lognormal distribution is estimated that approximates the known good data. In the preferred embodiment, the threshold parameter θ is first approximated from the sample at block 510, and then approximate values for the scale parameter μ and the shape parameter scan then be calculated from θ at blocks 512 and 514, respectively.

With respect to the process of block 510, the threshold parameter in the illustrated embodiment is estimated from the known good data set in order that the other parameters can be calculated. While typically the EMC of the kiln during drying is known, that value is not substituted for the threshold in the preferred embodiment. This is because, in order to quickly pull water out of wood, the wood is never allowed to reach the EMC of the kiln before the EMC is changed. Thus, in the illustrated embodiment, it is not assumed that the EMC is the threshold of the distribution.

In one embodiment, this is done through the technique of using local maximum likelihood estimators for θ, as will be understood. In one embodiment, a local maximum likelihood estimator for θ, using an ascending ordered sample $x_1$, $x_2$, K, $x_n$, is given by:

$$F(\theta) = \left[\sum_1^n \left(\frac{1}{x_i - \theta}\right)\right] * \left[n * \sum_1^n \ln(x_i - \theta) - n * \sum_1^n \ln^2(x_i - \theta) + \left(\sum_1^n \ln(x_i - \theta)\right)^2\right] - n^2 * \sum_1^n \left(\frac{\ln(x_i - \theta)}{x_i - \theta}\right) = 0 \quad (2)$$

This equation can then be solved using trial and error with linear interpolation to yield an estimator for the threshold parameter, $\hat{\theta}$. In other embodiments, when this technique does not yield a valid result, an alternative technique using modified moment estimators, as demonstrated in "Modified Moment Estimation for the Three-Parameter Lognormal Distribution," Cohen et al., 1985. Once a sufficient estimate for θ is found, estimates for the other two parameters can be found by:

$$\hat{\mu} = \frac{1}{n} * \sum_1^n \ln(x_i - \hat{\theta}) \quad (3)$$

$$\hat{\sigma}^2 = \frac{1}{n} * \sum_1^n \ln^2(x_i - \hat{\theta}) - \left[\frac{1}{n} * \sum_1^n \ln(x_i - \hat{\theta})\right]^2 \quad (4)$$

Relations (2), (3) and (4) come from "Estimating Parameters of Logarithmic-Normal Distributions by Maximum Likelihood," A. C. Cohen, 1951. After calculation of the Lognormal parameters, the process at block 516 creates one or more control charts. As was explained above, control charts can measure either the scale parameter, as in blocks 518 and 522, or the shape parameter, as in blocks 520 and 522. In the preferred embodiment, the shape and scale parameters are monitored, as values for them can be determined from the threshold parameter. While creating a control chart that directly monitors threshold is more difficult, changes in the threshold parameter in one embodiment can be observed when changes occur in either the shape or scale parameter without a corresponding change in the other. As will be discussed below with respect to FIG. 7, control charts may be created in either a logarithmic scale or in an "antilog" scale, which is the same scale in which the original moisture content data was taken.

Figure 6:
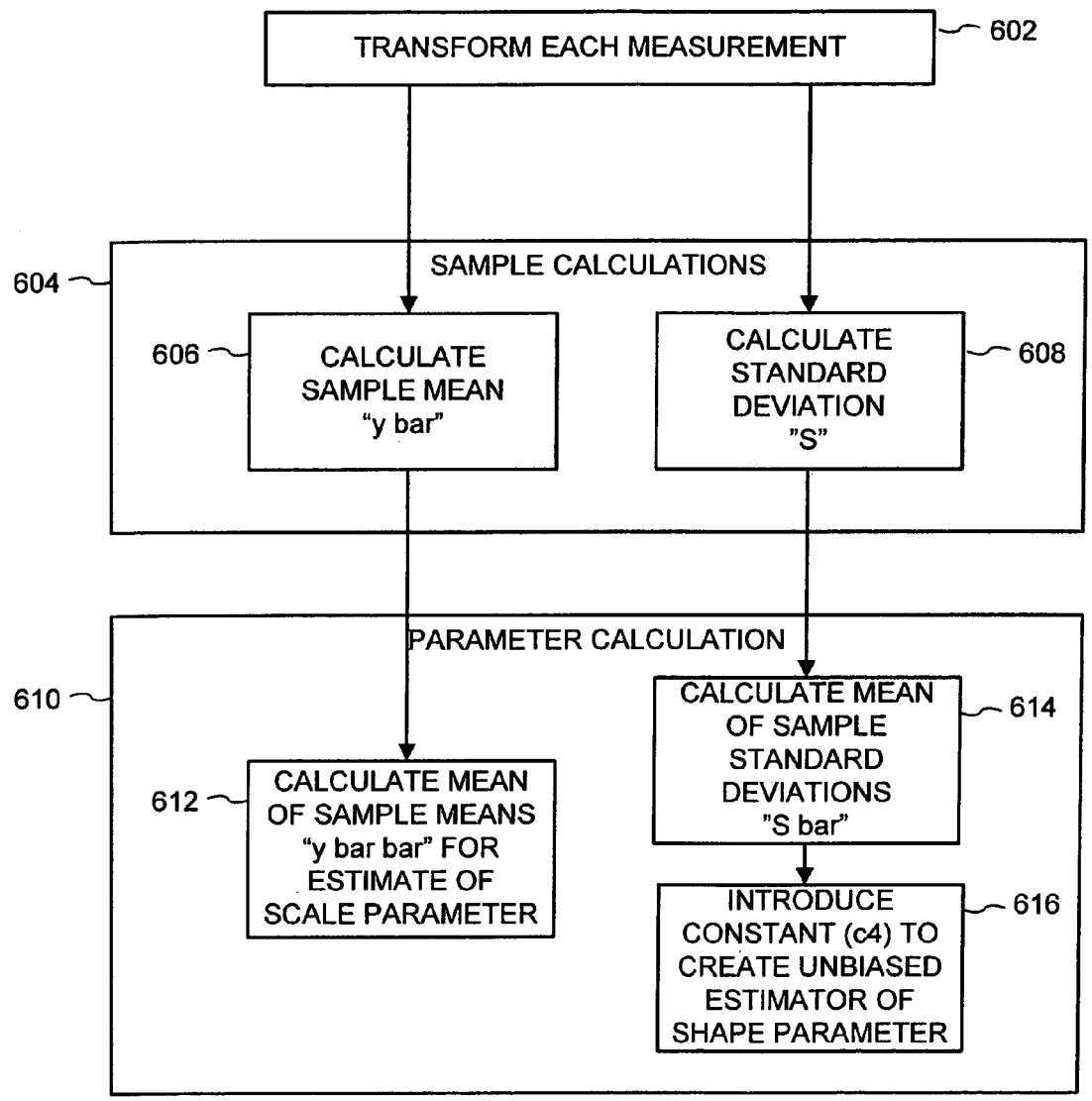
FIG. 6 is a block diagram of a method to estimate Lognormal shape and scale parameters.

FIG. 6 illustrates a block diagram which describes, in one embodiment, the process of calculating estimates for μ and σ. This process can be performed as the process of blocks 512 and 514 of FIG. 5. This process is equivalent to performing the calculations given above in (3) and (4). The illustrated embodiment assumes that the known good data set comprises m samples with each sample comprising n moisture content measurements. In a preferred embodiment, m is at least 20, while n is 5 or greater. At block 602, each sample $x_1$, $x_2$,..., $x_n$ is transformed to normality by first subtracting the estimated threshold parameter and then taking the natural logarithm, giving a normalized sample $y_1$, $y_2$, ..., $y_n$ by the equation:

$$\ln(x_i - \hat{\theta}) = y_i \quad (5)$$

Next, at block 604, calculations are made for each of the m samples. In block 606, for each sample a mean normalized value, $\bar{y}$, is calculated by taking the mean of each of the normalized measurements:

$$\bar{y} = \frac{y_1 + y_2 + K + y_n}{n} \quad (6)$$

Similarly, in block 608, the standard deviation, S, of each sample is calculated. Next, at block 610, the parameters μ and σ are calculated from the $\bar{y}$'s and S's by taking the mean over every sample. Thus, if $\bar{y}_i$ and $S_i$ are the mean and standard deviation of the $i^{th}$ sample, respectively, and there are m samples, then:

$$\bar{\bar{y}} = (\bar{y}_1 + \bar{y}_2 + K + \bar{y}_m)/m \quad (7)$$

$$\bar{S} = (S_1 + S_2 + K + S_m)/m \quad (8)$$

Because $\bar{\bar{y}}$ is an estimate of the population mean of the Normal variable, it is also an estimate of the scale parameter μ. Additionally, because of the way $\bar{\bar{y}}$ is created by mathematical manipulation of the logarithmically-normalized moisture content measurements, $\bar{\bar{y}}$ is in fact the geometric mean of those measurements, after taking threshold scaling into account. As mentioned above, the geometric mean is known to be a better indicator of the central tendency of Lognormal distributed variables.

$\bar{S}$ however, is not an unbiased estimator of the Lognormal shape parameter. In order to provide an unbiased estimate of σ, at block 616, in the preferred embodiment, $\bar{S}$ is divided by a constant, $c_4$, the value of which depends on the sample size. The values of $c_4$ for different sized samples can be found in the literature. Thus, an estimate for σ is provided by $\bar{S}/c_4$ in block 616 and the process of estimating the Lognormal parameters is completed.

Figure 7:
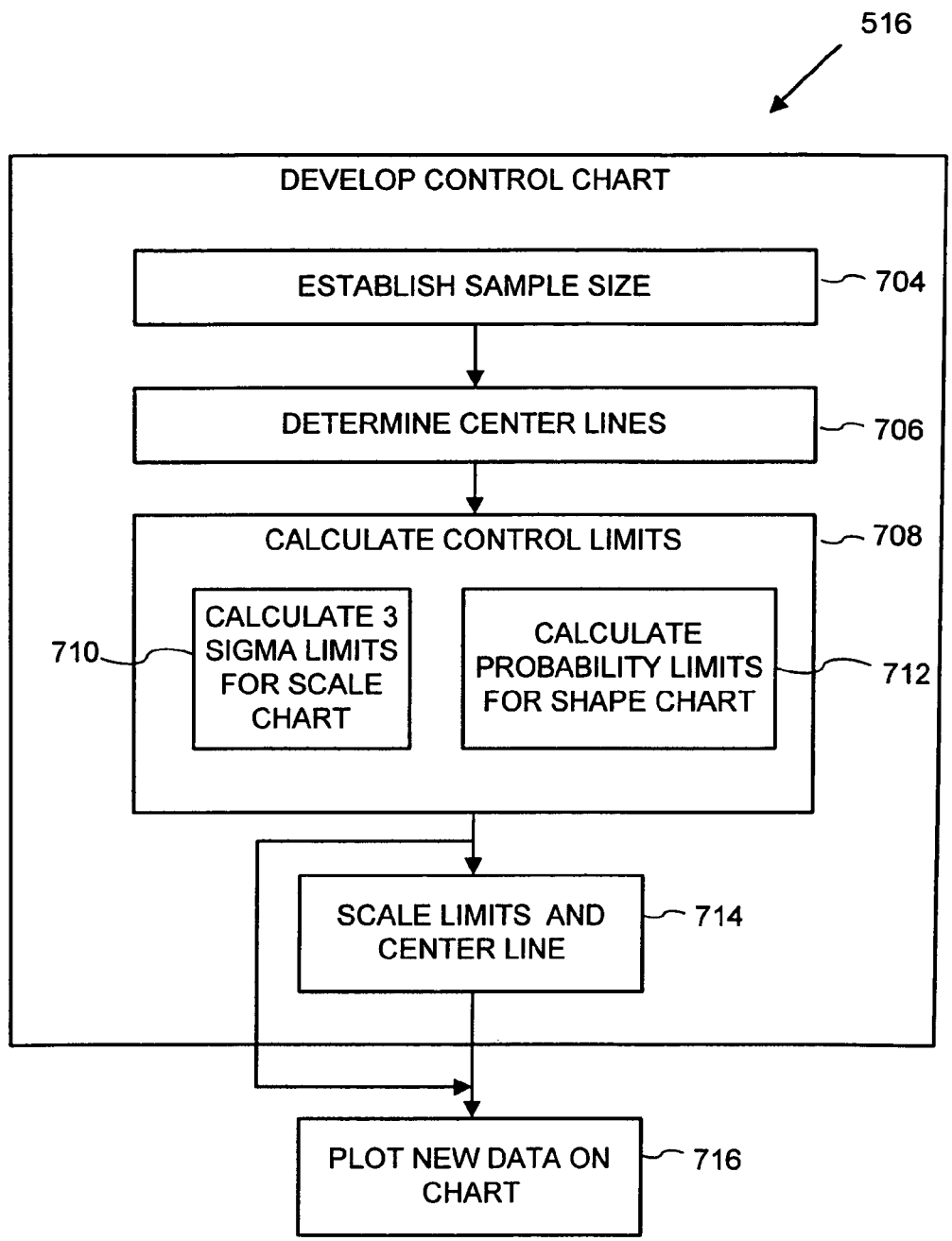
FIG. 7 is a block diagram of a method to create a control chart.

FIG. 7 illustrates a block diagram of, in one embodiment, a process used to create control charts for the scale and shape Lognormal parameters. Block 516 represents the process of developing the charts themselves before new data is plotted on them. Beginning with block 704, a sample size n is established for the all new data that will be measured as part of the SPC process. The sample size must be established because the control limits for the scale parameter are dependent on the sample size, as will be shown below. Next, at block 706, the center lines of the control charts are chosen. The center lines are simply $\hat{\mu}$ and $\hat{\sigma}$, as the control charts will be measuring changes in scale and shape of the Lognormal distribution. Because the estimated $\hat{\mu}$ and $\hat{\sigma}$ parameters have been calculated in the process illustrated in FIG. 6, the center lines are already known to be $\bar{y}$ and $\bar{S}/c_4$ for the scale and shape control charts, respectively. Next, in block 708, the control limits for each of the control charts are calculated.

For the scale chart, control limits are established is the traditional fashion for a control chart of averages. Thus, in block 710, in one embodiment, conventional "3-sigma" limits are established around the center line $\bar{y}$. The plotted data points will be averages of the transformed measurement samples, i.e. $\bar{y}$. The sample means $\bar{y}$ is normally distributed and has standard deviation $\hat{\sigma}/\sqrt{n}$. Hence the Upper Center Line, Center. Line, and Lower Center Line of the control chart are:

$$\begin{cases} UCL = \bar{\bar{y}} + 3 * \dfrac{\bar{S}}{c_4\sqrt{n}} \\ \text{Center Line} = \bar{\bar{y}} \\ LCN = \bar{\bar{y}} - 3 * \dfrac{\bar{S}}{c_4\sqrt{n}} \end{cases} \quad (9)$$

For the shape chart, because the sample standard-deviation is not normally distributed, 3-sigma limits cannot be used. However, it is known that the variance of a Normal variable such as Y is chi-square distributed. Thus, in one embodiment, at block 712 probability limits are used to calculate the control limits. In one embodiment, this is done by the following calculations:

$$\begin{cases} UCL = \dfrac{\bar{S}}{c_4}\sqrt{\dfrac{X^2_{\alpha/2,n-1}}{n-1}} \\ \text{Center Line} = \dfrac{\bar{S}}{c_4} \\ LCN = \dfrac{\bar{S}}{c_4}\sqrt{\dfrac{X^2_{1-\alpha/2,n-1}}{n-1}} \end{cases} \quad (10)$$

While the calculations given in (9) and (10) create control charts in one embodiment, because of the logarithmic transformation done on the data, the scale of the charts themselves has no units. Thus, it may not provide the detail of information desired when monitoring the wood drying process. Thus, in one embodiment, at block 714, the limits and center line are scaled to be put back into the original scale of measurement. In one embodiment this is done by taking the antilog of the limits or center line through exponentiation and then, in the case of the scale parameter, adding back the estimated threshold. The threshold does not affect the standard deviation and so does not need to be added back for the shape parameter chart. Thus the calculations in (9) become, in scaled form:

$$\begin{cases} UCL = \hat{\theta} + \exp\left(\bar{\bar{y}} + 3 * \dfrac{\bar{S}}{c_4\sqrt{n}}\right) \\ \text{Center Line} = \hat{\theta} + \exp(\bar{\bar{y}}) \\ LCN = \hat{\theta} + \exp\left(\bar{\bar{y}} - 3 * \dfrac{\bar{S}}{c_4\sqrt{n}}\right) \end{cases} \quad (11)$$

and the calculations of (10) become:

$$\begin{cases} UCL = \exp\left(\dfrac{\bar{S}}{c_4}\sqrt{\dfrac{X^2_{\alpha/2,n-1}}{n-1}}\right) \\ \text{Center Line} = \exp\left(\dfrac{\bar{S}}{c_4}\right) \\ LCN = \exp\left(\dfrac{\bar{S}}{c_4}\sqrt{\dfrac{X^2_{1-\alpha/2,n-1}}{n-1}}\right) \end{cases} \quad (12)$$

It will be demonstrated later that changing the scale in this manner does not qualitatively affect the general trends of the control charts, and thus the procedure of block 714 can be performed or not performed depending on the need of whoever or whatever is monitoring the control charts. Finally, at block 716, new data is plotted on the chart in order to monitor the drying process.

Figure 8:
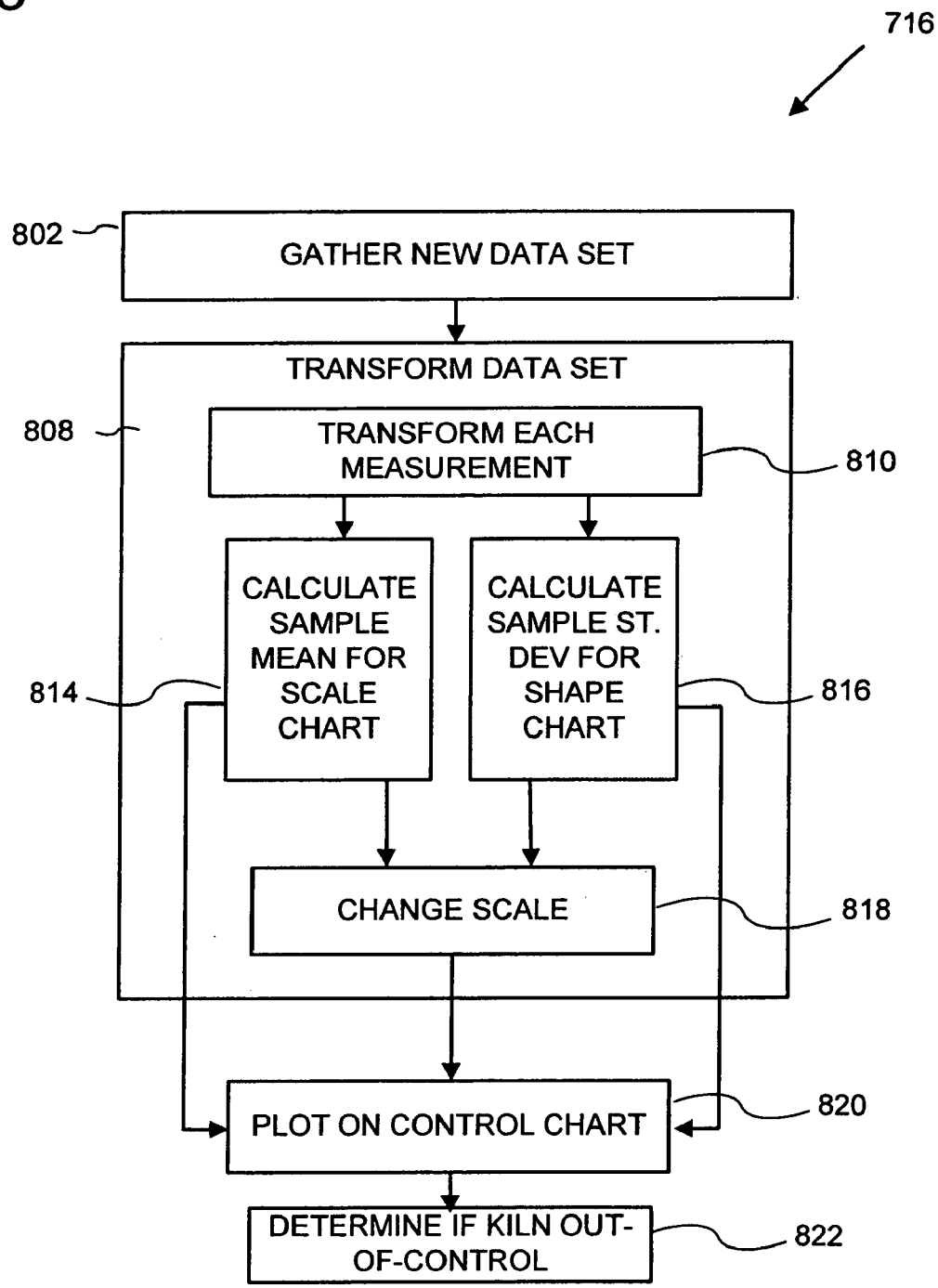
FIG. 8 is a block diagram of a method to sample, transform and plot sample data to determine if a kiln is out of control.

The process of block 716 is described in further detail with respect to FIG. 8. FIG. 8 shows, in one embodiment, the process of taking new data, transforming it, and plotting it on control charts so as to monitor the drying procedure. Starting at block 802, a new set of wood moisture content data is gathered. In a preferred embodiment, the gathering is done randomly and independently. In another preferred embodiment, the data is gathered from the same type of wood dried under the same conditions as that used to make the control charts. In yet another preferred embodiment, the new data is gathered in samples of the same size as was established at block 704. This is done to ensure that the proper calculations were performed for the control lines against which the new data will be measured. Continuing to block 808, the data is transformed so that it may be plotted on the chart. In block 810, each measurement is transformed from the original moisture content into a normalized logarithmic form, as was done for the known good set of data in block 602. Next, the data is manipulated by sample so that it may be plotted. In block 814, the mean of each transformed sample in one embodiment is calculated if the chart being plotted on is a scale chart. This is done by taking the mean of all of the transformed values for a single sample, creating a $\bar{y}$ value that can be plotted, similarly to the process described above in block 606. Thus, for each sample $x_1$, $x_2$, K, $x_n$ of size n, each plotted value $\bar{y}$ is computed by:

$$\bar{y} = \dfrac{1}{n} * \sum_1^n \ln(x_i - \hat{\theta}) \quad (13)$$

In block 816, in another embodiment the standard deviation of each sample of transformed data is calculated to determine an S value which can be plotted on a shape chart. Similarly to the discussion above with respect to FIG. 7, the data determined now is unitless; if the same scale as the original moisture content data is desired, the calculated scaled antilog of the $\bar{y}$ and S values must be found. Thus, in one embodiment, the $\bar{y}$ and S values are changed to the original scale. This is done, similarly to above, by exponentiating the values, and, if the chart is a scale chart, adding the threshold parameter back in. For example, for the scale chart the value to be plotted can be determined by:

$$\bar{y}_{antilog} = \hat{\theta} + \exp(\bar{y}_{log}) \quad (14)$$

Because $\bar{y}$ is the logarithmically-normalized mean of the original sample, $\bar{y}$ is related to the geometric mean of the original sample measurements. Thus, in an alternate embodiment, the original-scale plot values can be found for a sample by:

$$\bar{y}_{antilog} = \hat{\theta} + \text{geomean}(x_i - \hat{\theta}) \quad (15)$$

Where geomean is the geometric mean. Thus (15) can be peformed directly from the measurements by:

$$\bar{y}_{antilog} = \hat{\theta} + \left(\prod_i^n (x_i - \hat{\theta})\right)^{\frac{1}{n}} \quad (16)$$

Next, at block 820, the value is ready to be plotted on its control chart. Then, at block 822 in one embodiment, it is determined if the kiln is in an out-of-control state. In one embodiment determination that the kiln is out-of-control is done because a single $\bar{y}$ or S value falls out side of the set control limits. In another, a minimum set number of data points are required to fall outside the control limits before an out-of-control state is assumed. In another, an out-of-control state may be inferred by the proximity of data values to the control limits, regardless of whether and exceed the actual limits.

Figure 9A:
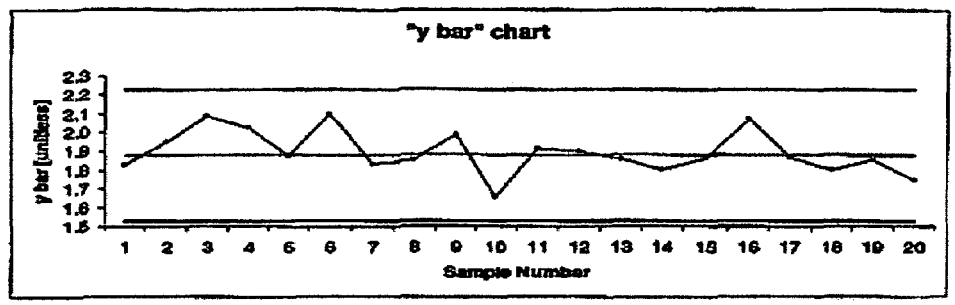
FIGS. 9*a*–9*d* are diagrams showing examples of control charts produced from a Lognormal distribution model.
Figure 9B:
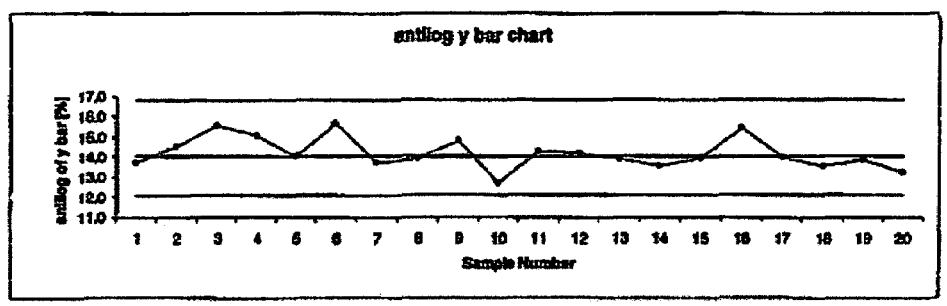
Figure 9C:
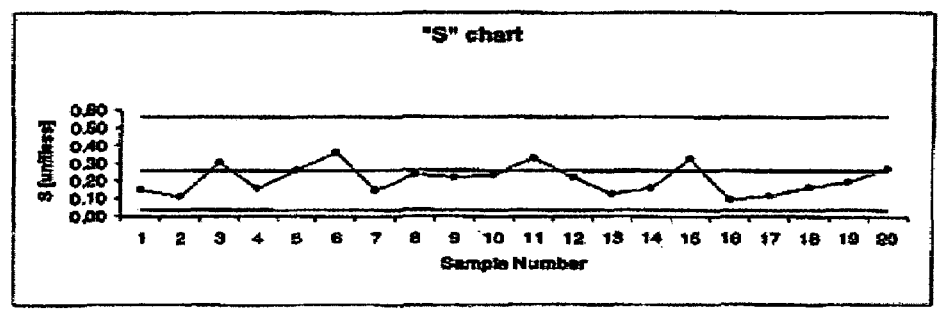
Figure 9D:
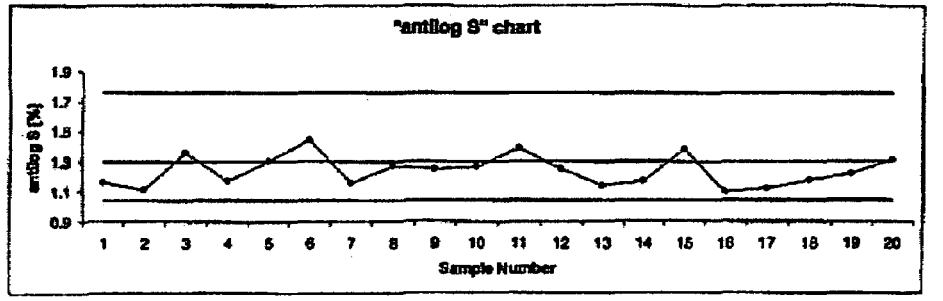

FIGS. 9a–d demonstrate examples of control charts for scale and shape, and illustrate the similarities between unitless charts and charts in the original moisture content units. In one embodiment these charts are displayed as new data is transformed and compared to the control limits and center lines computed above. In another embodiment the charts are not displayed, and other indications are made about the relation between the transformed data and the control limits and center lines. The charts of FIGS. 9a and 9b represent the same data for the scale parameter, with the chart of FIG. 9b having been transformed back into original unit scale. The charts of FIGS. 9a and 9b are known as "y bar" and "antilog y bar" respectively. There is a symmetry shift between the two charts; the chart of FIG. 9a is symmetrical around its center line due to the calculations in (9) while the chart in FIG. 9b is asymmetrical due to the exponentiation. However a graphical comparison between the two charts illustrates that trends from sample to sample are similarly represented in both the unitless and original scale charts. Similar tendencies can be observed in the unitless and original scale charts for the shape parameter in FIGS. 9c and 9d. Thus, the act of scaling discussed above with respect to FIGS. 7 and 8 is reasonable and in various embodiments can provide similar monitoring abilities as the unitless charts.

The method described above provides an improved process for statistically analyzing wood moisture content data in order to monitor drying kilns. The method produces control charts which can be easily monitored, by computer or by human, in order to determine if a given drying process is in-control. In view of the many possible embodiments to which the principles of our invention may be applied, we claim as our invention all such embodiments as may come within the scope and spirit of the following claims and equivalents thereto.

We claim:

1. A method of monitoring a kiln used for drying wood, comprising:
    obtaining a known good set of samples of preliminary moisture content data, the moisture content data obtained from measurements of moisture content data from wood dried in the kiln; and
    creating a statistical model which demonstrates the behavior of the kiln by estimating three parameters of a Lognormal distribution which approximates the known good data set, the three parameters comprising a threshold parameter, a shape parameter and a scale parameter.

2. The method of claim 1, further comprising:
    developing control limits and a center line configured for at least one control chart monitoring at least one of the three estimated parameters;
    obtaining at least one sample of new moisture content data from a batch of kiln-dried wood;
    transforming the new data to form transformed data which can be compared to the control limits and center line; and
    presenting a visual representation of the relation of the transformed data to the control limits and center line configured for the at least one control chart.

3. The method of claim 2, further comprising determining if the kiln is approaching an out-of-control state based at least in part on the relation of the transformed data to the control limits and center line; and
    wherein presenting a visual representation of the relation comprises, at least in part, displaying an indicator of the status of the kiln.

4. The method of claim 3, wherein determining if the kiln is approaching an out-of-control state is performed without human interaction.

5. The method of claim 2, wherein presenting a visual representation of the relation comprises visually displaying a control chart with the transformed data displayed on the chart.

6. The method of claim 2, wherein:
    each sample contains at least two measurements of moisture content data; and
    each sample contains identical numbers of moisture content measurements.

7. The method of claim 6, wherein estimating the scale and shape parameters comprises:
    subtracting the estimated threshold parameter from each preliminary moisture content measurement;
    normalizing each adjusted measurement by transforming each measurement logarithmically;
    determining, for each sample in the preliminary data, a mean transformed value from the transformed values in the sample;
    estimating the scale parameter by determining the mean of the mean transformed values for each preliminary sample; and
    estimating the shape parameter by:
        determining the standard deviation for the transformed values for each preliminary sample; and
        adjusting the standard deviation to account for bias.

8. The method of claim 6, wherein transforming the new data comprises:
    subtracting the estimated threshold parameter from each moisture content measurement; and
    normalizing each adjusted measurement by transforming each measurement logarithmically.

9. The method of claim 8, wherein the control limits and center line are configured for a control chart which monitors the scale parameter;
    wherein transforming the new data further comprises determining a transformed mean value for each sample by determining the mean of all of the normalized measurements in the sample; and wherein developing the control limits and center line configured for at least one control chart comprises:
  setting the center line to be the estimated scale parameter; and
  setting the control limits by determining limits based on the standard deviation of the mean values for the transformed samples around the estimated scale parameter.

10. The method of claim 9, wherein limits are 3-sigma limits.

11. The method of claim 9, wherein the control limits and center line are configured for a control chart has a logarithmic scale.

12. The method of claim 9, wherein the control limits and center line are configured for a control chart which has the same measurement scale as the new moisture content data;
  wherein transforming the new data further comprises:
    recovering the transformed mean value for each sample back into its original scale by exponentiation;
    adding back the estimated threshold parameter to each recovered mean value for each sample; and
  wherein developing the control limits and center line further comprises:
    transforming the control limits and the center line back into the original scale by exponentiation; and
    adding back the estimated threshold parameter to the transformed control limits and center line.

13. The method of claim 8, wherein the control limits and center line are configured for a control chart which monitors the shape parameter;
  wherein transforming the new data further comprises, for each sample, determining the standard deviation of all of the normalized measurements in the sample; and
  wherein developing the control limits and center line comprises:
    setting center line by finding the mean of all of the standard deviations of each transformed preliminary sample; and
    setting control limits by determining probability limits for the standard deviations for the preliminary data samples.

14. The method of claim 13, wherein developing the control limits and center line further comprises adjusting the mean of standard deviations to account for bias.

15. The method of claim 13, wherein the control limits and center line are configured for a control chart which has a logarithmic scale.

16. The method of claim 13, wherein the control limits and center line are configured for a control chart which has the same measurement scale as the new moisture content data;
  wherein transforming the new data further comprises:
    recovering the transformed standard deviation for each sample back into the original scale by exponentiation;
    adding back the estimated threshold parameter to each recovered standard deviation for each sample; and
  wherein developing the control limits and center line further comprises:
    transforming the control limits and the center line back into the original scale by exponentiation; and
    adding back the estimated threshold parameter to the transformed control limits and center line.

17. The method of claim 13, wherein determining probability limits comprises determining probability limits based on chi-square distribution.

18. The method of claim 1, wherein the threshold parameter is estimated through the use of a local maximum likelihood estimator.

19. The method of claim 1, wherein the threshold parameter is estimated through the use of modified moment estimators.

20. The method of claim 1, wherein the known good set of samples of preliminary moisture content data comprises data gathered when the kiln is known to be in an in-control state.

21. The method of claim 2, wherein the known good set of samples of data is taken under conditions similar to the conditions under which the at least one new data sample is obtained.

22. The method of claim 21, wherein the similar conditions include at least one of the following: kiln temperature, drying time, wood type, kiln type.

23. The method of claim 2, wherein the known good data set comprises multiple data points and obtaining at least one sample of new data further comprises gathering at least two data points independently.

24. The method of claim 2, wherein the good data set comprises multiple data points and obtaining at least one sample of new data further comprises gathering at least two data points randomly.

25. The method of claim 2, wherein the new data was gathered at a separate time from the known good data set.

26. The method of claim 2, wherein the new data comprises at least two data points gathered randomly.

27. The method of claim 2, wherein the new data comprises at least two data points gathered independently.

28. A computer-readable medium containing instructions that, when executed by a computer, cause the computer to perform a method for monitoring a kiln used for drying wood, the method comprising:
  obtaining a known good set of samples of preliminary moisture content data from a batch of kiln-dried wood;
  estimating, based at least in part on the preliminary moisture content data, parameters for a Lognormal distribution which approximates the preliminary data;
  obtaining new moisture content data from a batch of kiln-dried wood;
  using the estimated Lognormal distribution parameters, creating control limits and a center line configured for control charts measuring shape and scale of the distribution of new data;
  transforming the new data so that it can be represented on the control charts; and
  presenting a visual representation of the relation of the transformed data to the control limits and center line configured for a control chart.

29. The computer-readable medium of claim 28, further comprising determining if the kiln is approaching an out-of-control state by comparing the transformed data to the control limits and center line.

30. The computer-readable medium of claim 28, wherein the visual representation of the relation of the transformed data to the control limits and center line is a control chart.

31. The computer-readable medium of claim 28, wherein the known good set of preliminary moisture content data is obtained when the kiln is known to be in-control.

32. The computer-readable medium of claim 28, wherein the control limits and center line are configured for a control chart which has a logarithmic scale.

33. The computer-readable medium of claim 28, wherein the control limits and center line are configured for a control chart which has the same scale as the moisture content data.

* * * * *

UNITED STATES PATENT AND TRADEMARK OFFICE
CERTIFICATE OF CORRECTION

PATENT NO. : 7,043,970 B2 Page 1 of 2
APPLICATION NO. : 10/722389
DATED : May 16, 2006
INVENTOR(S) : Ristea et al.

It is certified that error appears in the above-identified patent and that said Letters Patent is hereby corrected as shown below:

<u>In the Cover page:</u>

Under Other Publications, "Modified Moment Estimation for the Three Parameter Lognormal Distribution" should be --"Modified Moment Estimation for the Three Parameter Lognormal Distribution"--.

Column 3, line 47, "patters." should be --patterns.--.

Column 3, line 51, "control charts" should be --control charts.--.

Column 4, line 50, "analyze the data" should be --analyze the data.--.

Column 5, line 10, "left had side" should be --left-hand side--.

Column 7, line 9, "scan" should be --$\sigma$ can--.

Column 9, line 7, "is the" should be --in the--.

Column 9, line 14, "Center. Line," should be --Center Line,--.

Column 9, line 50, "back'into" should be --back into--.

Column 11, line 20, "falls out side" should be --falls outside--.

UNITED STATES PATENT AND TRADEMARK OFFICE
CERTIFICATE OF CORRECTION

PATENT NO. : 7,043,970 B2
APPLICATION NO. : 10/722389
DATED : May 16, 2006
INVENTOR(S) : Ristea et al.

It is certified that error appears in the above-identified patent and that said Letters Patent is hereby corrected as shown below:

Column 13, line 12, "configured for a control chart has a logarithmic" should be --configured for a control chart having a logarithmic--.

Signed and Sealed this

First Day of April, 2008

JON W. DUDAS
*Director of the United States Patent and Trademark Office*